(12) United States Patent
Bitsi et al.

(10) Patent No.: US 10,992,192 B2
(45) Date of Patent: Apr. 27, 2021

(54) STATOR CORE OR A ROTOR CORE FOR AN ELECTRICAL MACHINE WITH REDUCED EDDY CURRENT LOSSES AND HIGH MAGNETIC CONDUCTIVITY AND MECHANICAL STRENGTH

(71) Applicant: ABB Schweiz AG, Baden (CH)

(72) Inventors: Konstantina Bitsi, Hägersten (SE); Reza Rajabi Moghaddam, Västerås (SE); Stefan Toader, Västerås (SE)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 16/959,021

(22) PCT Filed: Nov. 13, 2018

(86) PCT No.: PCT/EP2018/081024
§ 371 (c)(1),
(2) Date: Jun. 29, 2020

(87) PCT Pub. No.: WO2019/141400
PCT Pub. Date: Jul. 25, 2019

(65) Prior Publication Data
US 2020/0336025 A1 Oct. 22, 2020

(30) Foreign Application Priority Data
Jan. 17, 2018 (EP) .................................... 18152089

(51) Int. Cl.
*H02K 1/16* (2006.01)
*H02K 1/20* (2006.01)
(Continued)

(52) U.S. Cl.
CPC ............... *H02K 1/165* (2013.01); *H02K 1/20* (2013.01); *H02K 1/265* (2013.01); *H02K 1/32* (2013.01)

(58) Field of Classification Search
CPC ............ H02K 1/165; H02K 1/16; H02K 1/20; H02K 1/265; H02K 1/26; H02K 1/32
(Continued)

(56) References Cited

U.S. PATENT DOCUMENTS 3,116,429 A    12/1963  Harrington et al.
4,217,511 A *   8/1980  King, Jr. ................... H02K 1/20
                                                       310/55
(Continued)

FOREIGN PATENT DOCUMENTS

CN    1106584 A    8/1995
CN    1126900 A    7/1996
(Continued)

OTHER PUBLICATIONS

Machine translation of JP-2010045897-A. (Year: 2010).*
(Continued)

*Primary Examiner* — Michael Andrews
(74) *Attorney, Agent, or Firm* — Whitmyer IP Group LLC

(57) ABSTRACT

A stator core or a rotor core for an electrical machine, the core including a plurality of teeth separated by slots in a circumferential direction of the core, and a plurality of lamination stacks arranged one after another in an axial direction of the core, and separated from each other in the axial direction by cooling ducts. Each lamination stack includes at its each end in the axial direction at least one slit tooth section providing a discontinuity in the electrical conductivity of the lamination material and thereby reducing eddy current losses at the respective slit tooth section, and between the slit tooth sections at least one regular tooth section.

21 Claims, 3 Drawing Sheets

(51) Int. Cl.
*H02K 1/26* (2006.01)
*H02K 1/32* (2006.01)

(58) Field of Classification Search
USPC ..... 310/216.016, 216.001, 216.004, 216.094
See application file for complete search history.

(56) References Cited

U.S. PATENT DOCUMENTS

| | | | |
|---|---|---|---|
| 9,583,987 B2 | 2/2017 | Ikuta et al. | |
| 2018/0233997 A1* | 8/2018 | Takahashi | H02K 15/024 |

FOREIGN PATENT DOCUMENTS

| | | | | |
|---|---|---|---|---|
| CN | 1155177 A | | 7/1997 | |
| CN | 103026584 A | | 4/2013 | |
| CN | 106655563 A | | 5/2017 | |
| EP | 0790696 A1 | | 8/1997 | |
| JP | 2002101579 A | * | 4/2002 | ............ H02K 1/14 |
| JP | 2002101579 A | | 4/2002 | |
| JP | 2010045897 A | * | 2/2010 | ............ H02K 1/18 |
| JP | 2010045897 A | | 2/2010 | |
| JP | 2011097737 A | | 5/2011 | |
| JP | 5058097 B2 | | 10/2012 | |
| JP | 2013021789 A | | 1/2013 | |
| JP | 2017169308 A | | 9/2017 | |
| WO | 2011121982 A1 | | 10/2011 | |
| WO | 201216746 A2 | | 2/2012 | |

OTHER PUBLICATIONS

Machine translation of JP-2002101579-A. (Year: 2002).*
Korean Office Action; Application No. 10-2020-7022782; dated Sep. 23, 2020; 13 Pages.
International Search Report and Written Opinion of the International Searching Authority application No. PCT/EP2018/081024 Completed: Jan. 28, 2019; dated Feb. 4, 2019 11 pages.
Chinese Office Action and Translation; Application No. 2018880086755.4; dated Nov. 23, 2020; 9 Pages.

* cited by examiner

STATOR CORE OR A ROTOR CORE FOR AN ELECTRICAL MACHINE WITH REDUCED EDDY CURRENT LOSSES AND HIGH MAGNETIC CONDUCTIVITY AND MECHANICAL STRENGTH

TECHNICAL FIELD

The present invention relates to a stator core or a rotor core for an electrical machine.

BACKGROUND

Referring to FIGS. 1, 2 and 3, a conventional stator core 10 (or a rotor core 10) for an electrical machine comprises a plurality of stator teeth 20 separated by stator slots 30 in a circumferential direction 100 of the stator core 10, and a stator yoke 170. Each stator tooth 20 consists of a plurality of corresponding lamination teeth 80, 140 of thin laminations 70, 130, the lamination teeth 80, 140 of each lamination 70, 130 being separated by lamination slots 90 in the circumferential direction 100. The stator yoke 170 consists of a plurality of corresponding regular lamination yokes 180 of the laminations 70, 130. A plurality of lamination stacks 40 is arranged one after another in an axial direction 50 of the stator core 10, each lamination stack 40 comprising a plurality of laminations 70, 130 stacked one after another in the axial direction 50 such that each pair of neighboring laminations 70, 130 is in contact with each other. The lamination stacks 40 are separated from each other in the axial direction 50 by cooling ducts 60.

It is conventionally known to form lamination stacks 40 of solely regular laminations 70 (embodiment of FIG. 1), each regular lamination 70 comprising a plurality of regular lamination teeth 80 separated by lamination slots 90 in the circumferential direction 100 to form respective regular stator tooth sections 110 and stator slot sections 120 in the axial direction 50. In the context of this disclosure a "regular lamination tooth" shall be considered to refer to a lamination tooth with no slit 160 providing a discontinuity in the electrical conductivity of the lamination material.

It is furthermore conventionally known, e.g. from JP2011097737, to form lamination stacks 40 of solely slit laminations 130 (lamination stack embodiment not shown), each slit lamination 130 comprising a plurality of slit lamination teeth 140 separated by lamination slots 90 in the circumferential direction 100 to form respective slit stator tooth sections 150 (see FIG. 4) and stator slot sections 120 in the axial direction 50, each slit lamination tooth 140 comprising a slit 160 providing a discontinuity in the electrical conductivity of the lamination material.

It is furthermore conventionally known, e.g. from JP5058097, to provide lamination stacks 40 with end plates next to cooling ducts 60, the end plates comprising slits 160 that provide discontinuity in the electrical conductivity of the end plate material. The slits 160 have a function to reduce eddy current losses; in the case of JP2011097737 caused by axial magnetic flux at the ends of the stator core 10, and in the case of JP5058097 caused by shift of magnetic flux from inner interval pieces to the stator core 10.

While the slits 160 reduce eddy current losses, at the same time they reduce the magnetic conductivity in the desired flux direction, and mechanical strength of the stator core 10. There therefore remains a desire to reduce eddy current losses while at the same time reducing the magnetic conductivity and mechanical strength of the stator core 10 as little as possible.

SUMMARY

One object of the invention is to provide an improved stator core for an electrical machine. Particularly the object is to provide a stator core with reduced eddy current losses and high magnetic conductivity and mechanical strength.

This object is achieved by the device according to appended claim 1.

The invention is based on the realization that eddy current losses have significance at a plurality of laminations closest to axial ends of lamination stacks, and that all the significant eddy current losses can be removed by providing each axial end of the lamination stacks with slit stator tooth sections extending over the plurality of laminations. At the same time a maximal magnetic conductivity and mechanical strength of the stator core is maintained where the eddy current losses have no significance by providing regular stator tooth sections between the slit stator tooth sections. The eddy current losses have most significance at stator teeth close to the tops of the same, but may also have significance at any other parts of the stator teeth and at the stator yoke.

According to a first aspect of the invention, there is provided a stator core or a rotor core for an electrical machine. The core comprises a plurality of teeth separated by slots in a circumferential direction of the core, and a plurality of lamination stacks arranged one after another in an axial direction of the core. The lamination stacks are separated from each other in the axial direction by cooling ducts. Each lamination stack comprises a plurality of laminations arranged one after another in the axial direction such that each pair of neighboring laminations is in contact with each other. Each lamination stack comprises among the plurality of laminations a plurality of regular laminations, each regular lamination comprising a plurality of regular lamination teeth separated by lamination slots in the circumferential direction to form respective regular tooth sections and slot sections when at least two regular laminations are arranged next to each other. Each lamination stack further comprises among the plurality of laminations a plurality of slit laminations, each slit lamination comprising a plurality of slit lamination teeth separated by lamination slots in the circumferential direction to form respective slit tooth sections and slot sections when at least two slit laminations are arranged next to each other. Each slit lamination tooth comprises at least one slit providing a discontinuity in the electrical conductivity of the lamination material, the at least one slit being configured to reduce eddy current losses at the respective slit lamination. Each lamination stack comprises at its each end in the axial direction at least one slit tooth section, and between the slit tooth sections at least one regular tooth section.

According to one embodiment of the invention, each slit tooth section comprises at least five slit lamination teeth, such as at least ten slit lamination teeth or at least twenty slit lamination teeth.

According to one embodiment of the invention, both the regular laminations and the slit laminations have the same thickness.

According to one embodiment of the invention, all of the plurality of slit laminations are identical with each other.

According to one embodiment of the invention, all of the plurality of regular laminations are identical with each other.

According to one embodiment of the invention, all of the plurality of regular laminations are, apart from the slits, identical with all of the plurality of slit laminations.

According to one embodiment of the invention, each regular lamination comprises solely regular lamination teeth.

According to one embodiment of the invention, each slit lamination comprises solely slit lamination teeth.

According to one embodiment of the invention, all of the plurality of regular lamination teeth are identical with each other.

According to one embodiment of the invention, all of the plurality of slit lamination teeth are identical with each other.

According to one embodiment of the invention, all of the plurality of regular lamination teeth are, apart from the slits, identical with all of the plurality of slit lamination teeth.

According to one embodiment of the invention, the at least one slit does not reach in the radial direction extreme contours of the respective slit lamination.

According to one embodiment of the invention, the at least one slit does not reach any contour of the respective slit lamination.

According to one embodiment of the invention, at least some of the slit laminations further comprise slit lamination yokes provided with a plurality of slits, wherein the slit lamination yokes form slit lamination yoke sections when at least two slit lamination yokes are arranged next to each other, and wherein the core comprises at least one slit lamination yoke section.

According to one embodiment of the invention, each of the two lamination stacks farthest out in the axial direction comprises a slit lamination yoke section at its end facing away from the core in the axial direction.

BRIEF DESCRIPTION OF THE DRAWINGS

The invention will be explained in greater detail with reference to the accompanying drawings, wherein.

DETAILED DESCRIPTION

Figure 4:
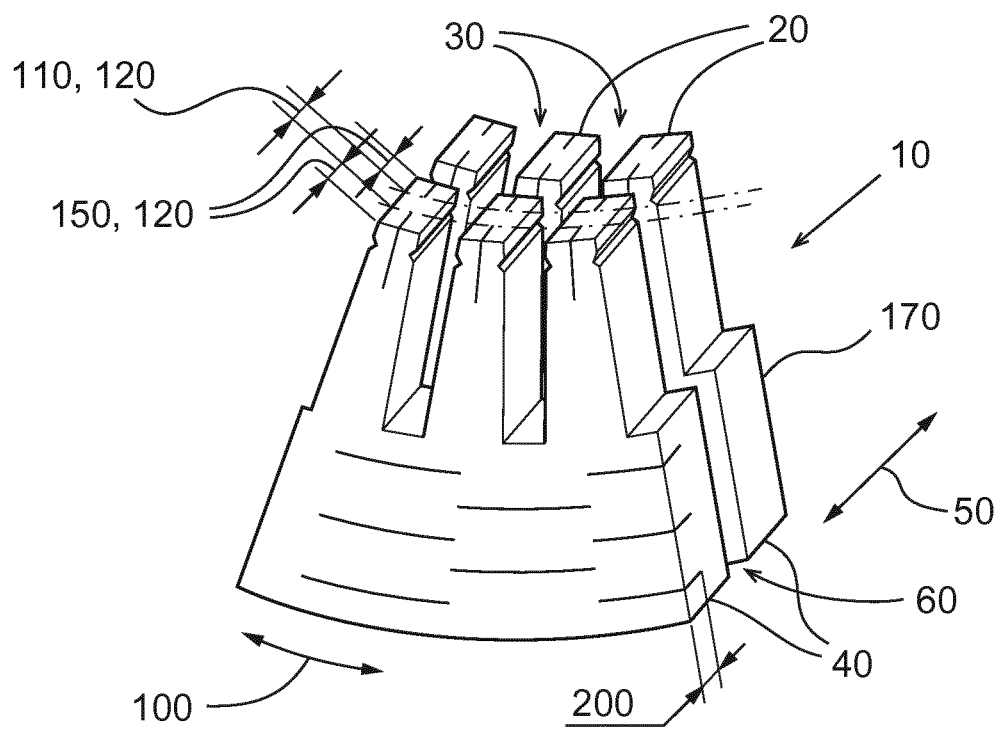
FIG. 4 shows a section of a stator core or a rotor core according to one embodiment of the invention.

Referring to FIG. 4, a stator core 10 (or a rotor core 10) according to one embodiment of the invention comprises a plurality of lamination stacks 40 arranged one after another in an axial direction 50 of the stator core 10. The lamination stacks 40 are separated from each other in the axial direction 50 by cooling ducts 60. Each lamination stack 40 comprises a plurality of laminations 70, 130 arranged one after another in the axial direction 50 such that each pair of neighboring laminations 70, 130 is in contact with each other. The laminations 70, 130 may comprise electrical steel as a lamination material, and they may in addition comprise an appropriate coating on the surface of the lamination material.

Figure 1:
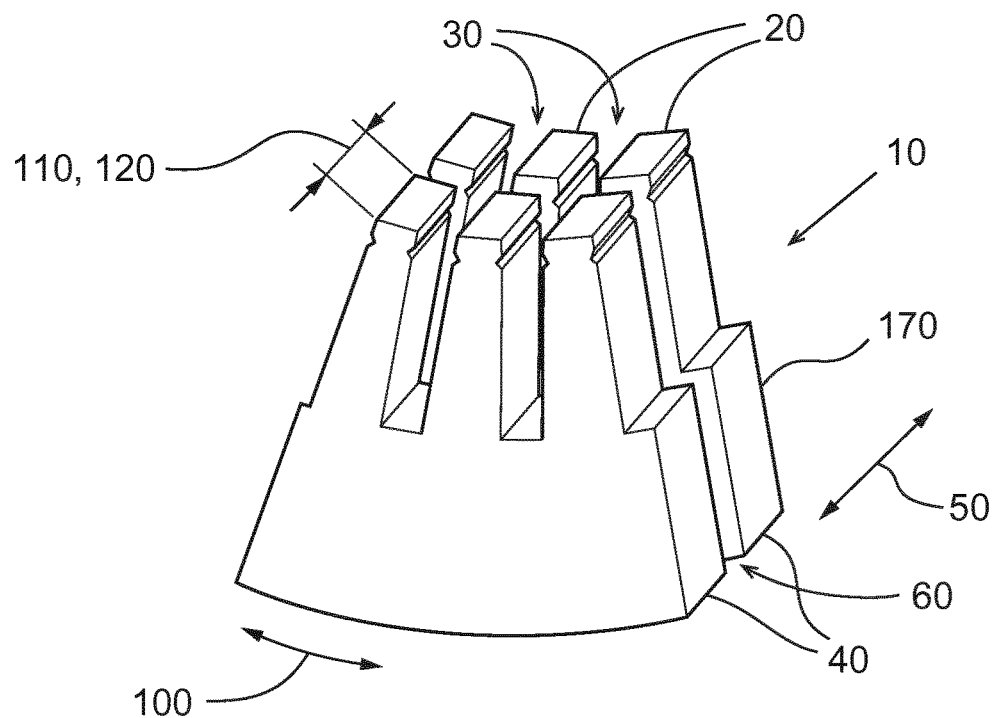
FIG. 1 shows a section of an embodiment of a conventional stator core or rotor core.
Figure 2:
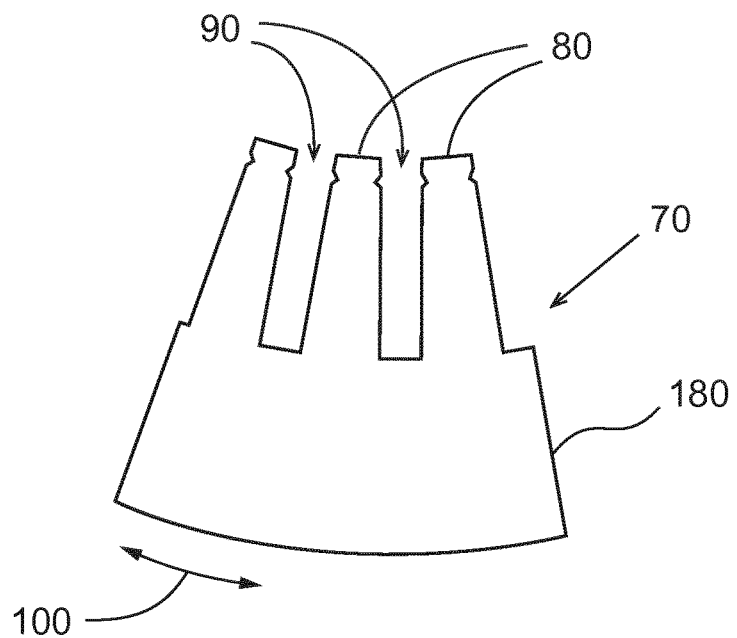
FIG. 2 shows a section of an embodiment of a conventional regular lamination.

Each lamination stack 40 comprises a plurality of regular laminations 70 e.g. such as that shown in FIG. 2. Each regular lamination 70 comprises a plurality of regular lamination teeth 80 separated by lamination slots 90 in the circumferential direction 100. When at least two regular laminations 70 are arranged next to each other, i.e. stacked one after another in the axial direction 50, they form respective regular stator tooth sections 110 and stator slot sections 120.

Figure 3:
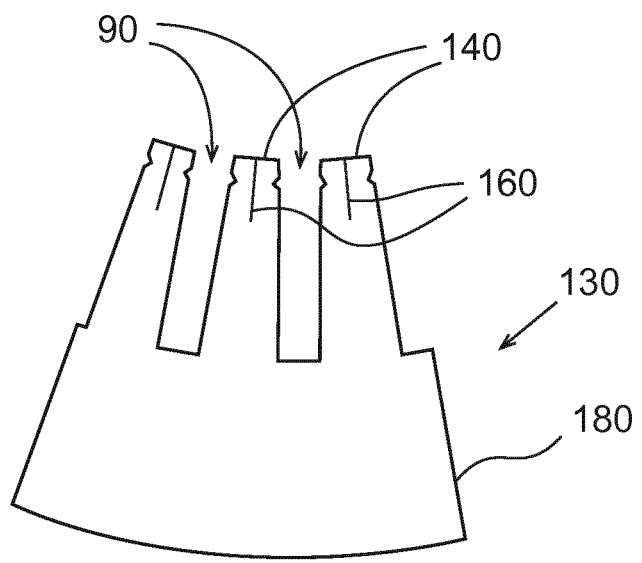
FIG. 3 shows a section of an embodiment of a conventional slit lamination.
Figure 5:
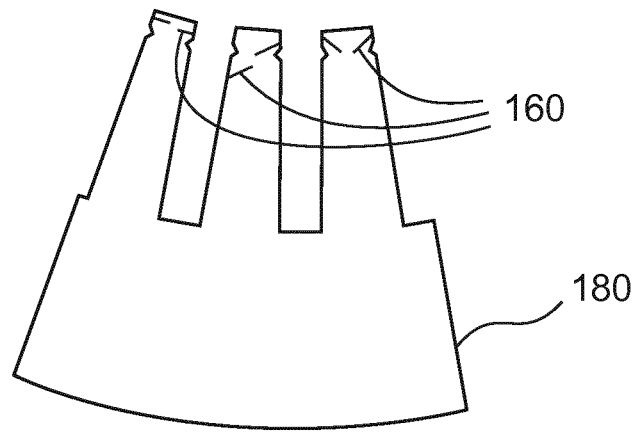
FIG. 5 shows slit lamination teeth according to some embodiments of the invention.
Figure 6:
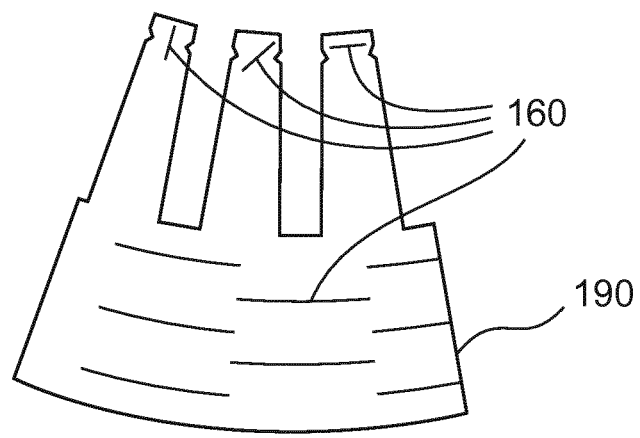
FIG. 6 shows slit lamination teeth and a slit lamination yoke according to some embodiments of the invention.

Each lamination stack 40 further comprises a plurality of slit laminations 130 e.g. such as those shown in FIGS. 3, 5 and 6, each slit lamination 130 comprising a plurality of slit lamination teeth 140 separated by lamination slots 90 in the circumferential direction 100. When at least two slit laminations 130 are arranged next to each other, i.e. stacked one after another in the axial direction 50, they form respective slit stator tooth sections 150 and stator slot sections 120. Each slit lamination tooth 140 comprises a slit 160 providing a discontinuity in the electrical conductivity of the lamination material, the slit 160 being configured to reduce eddy current losses at the respective slit lamination 130.

Each lamination stack 40 comprises at its each end in the axial direction 50 a slit stator tooth section 150, and between the slit stator tooth sections 150 a regular stator tooth section 110. The slit stator tooth sections 150 may comprise e.g. five, ten or twenty slit lamination teeth 140. At least some of the slit laminations 130 may furthermore comprise slit lamination yokes 190 provided with a plurality of slits 160. When at least two slit lamination yokes 190 are arranged next to each other, i.e. stacked one after another in the axial direction 50, they form respective slit lamination yoke sections 200. In particular, each of the two lamination stacks 40 farthest out in the axial direction 50 may comprise a slit lamination yoke section 200 at its end facing away from the stator core 10 in the axial direction 50. The axial end regions of the stator core 10 are particularly exposed to axial magnetic flux due to the winding ends outside of the stator core 10, and therefore at these regions the corresponding eddy current losses may have significance even at the stator yoke 170.

Both the regular laminations 70 and the slit laminations 130 may have the same thickness. All the slit laminations 130 may be identical with each other, and all the regular laminations 70 may also be identical with each other. All the regular laminations 70 may also, apart from the slits 160, be identical with all the slit laminations 130. Each regular lamination 70 may comprise solely regular lamination teeth 80, and each slit lamination 130 may comprise solely slit lamination teeth 140. All the regular lamination teeth 80 may be identical with each other, and all the slit lamination teeth 140 may also be identical with each other. All the regular lamination teeth 80 may also, apart from the slits 160, be identical with all slit lamination teeth 140.

Referring to FIG. 5, instead of one slit 160, each slit lamination tooth 140 may comprise a plurality of slits 160. The number of slits 160 can be two, three, four, or more. The slits 160 may be positioned such that they do not reach in the radial direction extreme contours of the slit lamination teeth 140. Referring to FIG. 6, the slits 160 may furthermore be positioned such that they do not reach any contour of the slit lamination teeth 140. According to FIGS. 3, 5 and 6 the slits 160 are provided close to or at the tops of the slit lamination teeth 140 i.e. close to in the radial direction innermost extreme contours of the slit lamination teeth 140 where the eddy current losses probably have most significance, but the slits 160 can also be provided at any other parts of the slit lamination teeth 140. Furthermore, as shown in FIG. 6, the slits 160 may even be provided to form slit lamination yokes 190. It is to be understood that each of the different slit lamination teeth 140 shown in FIGS. 5 and 6 may be used alone or in combination with any of the remaining slit lamination teeth 140, and also in combination with both regular lamination yokes 180 and slit lamination yokes 190.

The slits 160 may be formed by removing lamination material from the slit lamination teeth 140. The slits 160 may have a width of e.g. 0.5 to 2 mm, and they may form narrow openings in the slit lamination teeth 140. The slits 160 may also be formed by locally changing the electrical conductivity of the lamination material without removing lamination material from the slit lamination teeth 140. This can be achieved e.g. by mechanically forming the slit lamination teeth 140.

The invention is not limited to the embodiments shown above, but the person skilled in the art may modify them in a plurality of ways within the scope of the invention as defined by the claims. Particularly, it is to be understood that the invention can be applied not only to stators of electrical machines but also to rotors of the same.

The invention claimed is:

1. A stator core or a rotor core for an electrical machine, the core comprising:
    a plurality of teeth separated by slots in a circumferential direction of the core,
    a plurality of lamination stacks arranged one after another in an axial direction of the core, and separated from each other in the axial direction by cooling ducts, each lamination stack including a plurality of laminations arranged one after another in the axial direction such that each pair of neighboring laminations is in contact with each other, each lamination stack including among the plurality of laminations a plurality of regular laminations, each regular lamination including a plurality of regular lamination teeth separated by lamination slots in the circumferential direction to form respective regular tooth sections and slot sections when at least two regular laminations are arranged next to each other, each lamination stack further including among the plurality of laminations a plurality of slit laminations, each slit lamination including a plurality of slit lamination teeth separated by lamination slots in the circumferential direction to form respective slit tooth sections and slot sections when at least two slit laminations are arranged next to each other, each slit lamination tooth including at least one slit providing a discontinuity in the electrical conductivity of the lamination material, the at least one slit being configured to reduce eddy current losses at the respective slit lamination,
    wherein each lamination stack includes at its each end in the axial direction at least one slit tooth section, and between the slit tooth sections at least one regular tooth section.

2. The core according to claim 1, wherein each slit tooth section comprises at least five slit lamination teeth.

3. The core according to claim 2, wherein both the regular laminations and the slit laminations have the same thickness.

4. The core according to claim 2, wherein all of the plurality of slit laminations are identical with each other.

5. The core according to claim 2, wherein all of the plurality of regular laminations are identical with each other.

6. The core according to claim 2, wherein all of the plurality of regular laminations are, apart from the slits, identical with all of the plurality of slit laminations.

7. The core according to claim 2, wherein each regular lamination comprises solely regular lamination teeth.

8. The core according to claim 1, wherein both the regular laminations and the slit laminations have the same thickness.

9. The core according to claim 1, wherein all of the plurality of slit laminations are identical with each other.

10. The core according to claim 1, wherein all of the plurality of regular laminations are identical with each other.

11. The core according to claim 1, wherein all of the plurality of regular laminations are, apart from the slits, identical with all of the plurality of slit laminations.

12. The core according to claim 1, wherein each regular lamination comprises solely regular lamination teeth.

13. The core according to claim 1, wherein each slit lamination comprises solely slit lamination teeth.

14. The core according to claim 1, wherein all of the plurality of regular lamination teeth are identical with each other.

15. The core according to claim 1, wherein all of the plurality of slit lamination teeth are identical with each other.

16. The core according to claim 1, wherein all of the plurality of regular lamination teeth are, apart from the slits, identical with all of the plurality of slit lamination teeth.

17. The core according to claim 1, wherein the at least one slit does not reach in the radial direction extreme contours of the respective slit lamination.

18. The core according to claim 1, wherein the at least one slit does not reach any contour of the respective slit lamination.

19. The core according to claim 1, wherein at least some of the slit laminations further comprise slit lamination yokes provided with a plurality of slits, wherein the slit lamination yokes form slit lamination yoke sections when at least two slit lamination yokes are arranged next to each other, and wherein the core includes at least one slit lamination yoke section.

20. The core according to claim 19, wherein each of the two lamination stacks farthest out in the axial direction includes a slit lamination yoke section at its end facing away from the core in the axial direction.

21. The core according to claim 1, wherein the at least one regular tooth section is located between the slit tooth sections in the axial direction.

\* \* \* \* \*